United States Patent [19]

Senger

[11] 4,055,209
[45] Oct. 25, 1977

[54] PNEUMATIC RADIAL TIRE TREAD PATTERN

[75] Inventor: Gerhard Franz-Josef Senger, Aachen, Germany

[73] Assignee: Uniroyal Aktiengesellschaft, Aachen, Germany

[21] Appl. No.: 685,845

[22] Filed: May 13, 1976

[30] Foreign Application Priority Data

Sept. 25, 1975 Germany .................................. 3139
Nov. 5, 1975 Germany ............................ 2549668

[51] Int. Cl.² .................... B60C 11/06; B60C 11/12
[52] U.S. Cl. ............................................... 152/209 R
[58] Field of Search .......... 152/209 R, 209 D, 362 R; D12/136–151

[56] References Cited

U.S. PATENT DOCUMENTS

| 2,479,958 | 8/1949 | Norman | 152/209 R |
| 3,512,567 | 5/1970 | Verdier | 152/209 R |
| 3,777,799 | 12/1973 | Montagne | 152/362 R |
| 3,986,545 | 10/1976 | Montagne | 152/209 R |
| D. 239,273 | 3/1976 | Senger | D12/151 X |

Primary Examiner—Drayton E. Hoffman
Assistant Examiner—Fred Silverberg
Attorney, Agent, or Firm—Charles A. Blank

[57] ABSTRACT

A pneumatic radial tire having tread, outer shoulder, and sidewall portions of elastomeric material over a radial carcass. The tread and outer shoulder portions comprise similar circumferentially overlapping patterns of lugs and grooves. The majority of the edges of the lugs are disposed at an angle of approximately 60° with respect to the equator of the tire. The tire has a groove adjacent each outer shoulder portion and bounded by radially displaced adjacent outer shoulder lug portions and by radially displaced adjacent sidewall lugs. Each such groove adjacent each outer shoulder portion has relatively long sections extending circumferentially of the tire. The tire has a tread having at all points of the tread lug contact area substantially identical surface pressures and has high road holding ability on dry as well as on wet or snow-covered roads. The tire is also effective in draining a substantial volume of water or waterlogged snow and provides improved travel comfort.

4 Claims, 4 Drawing Figures

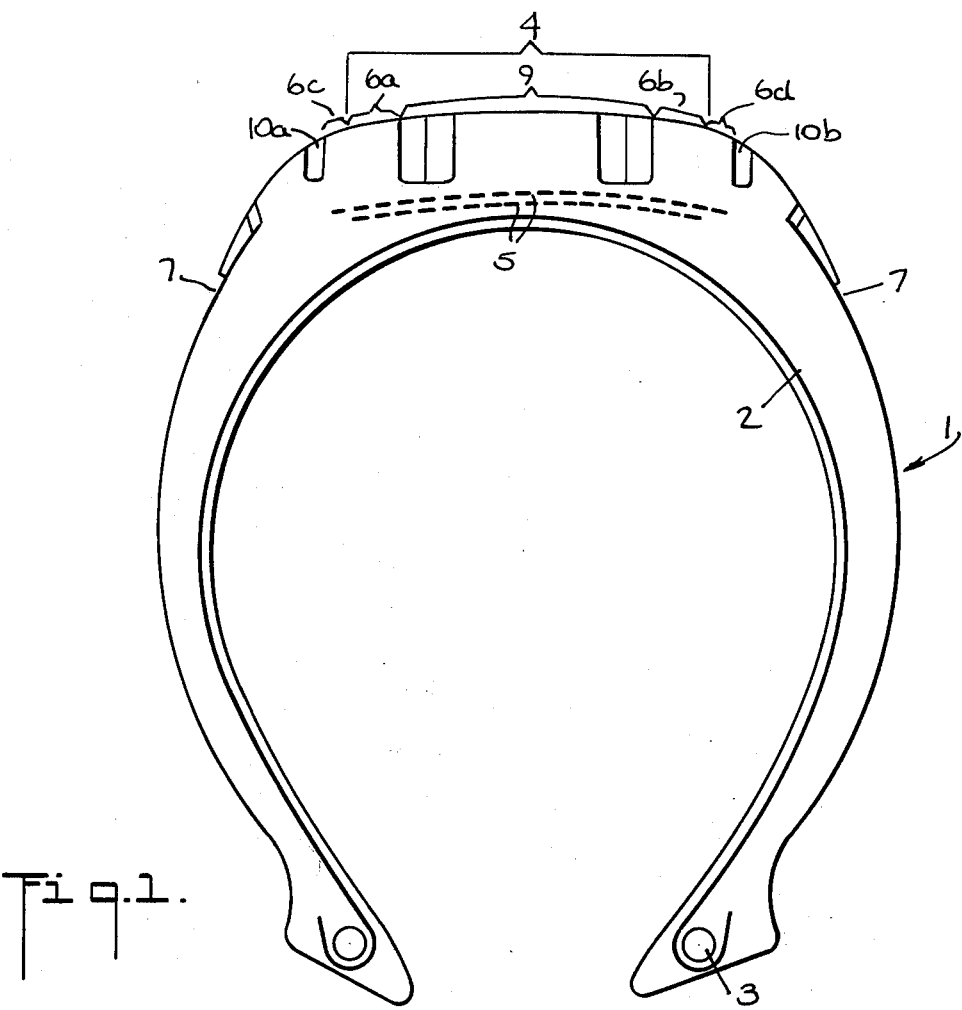
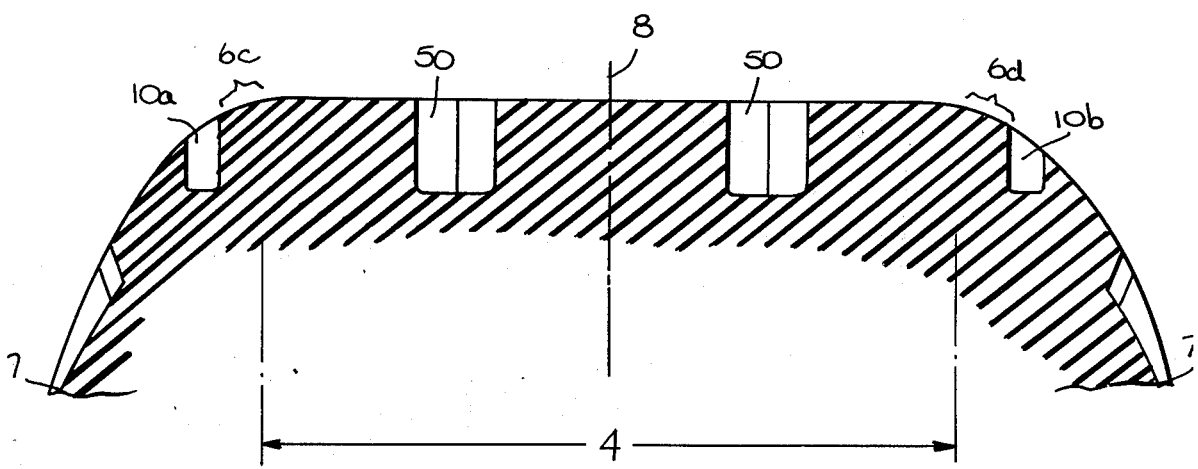

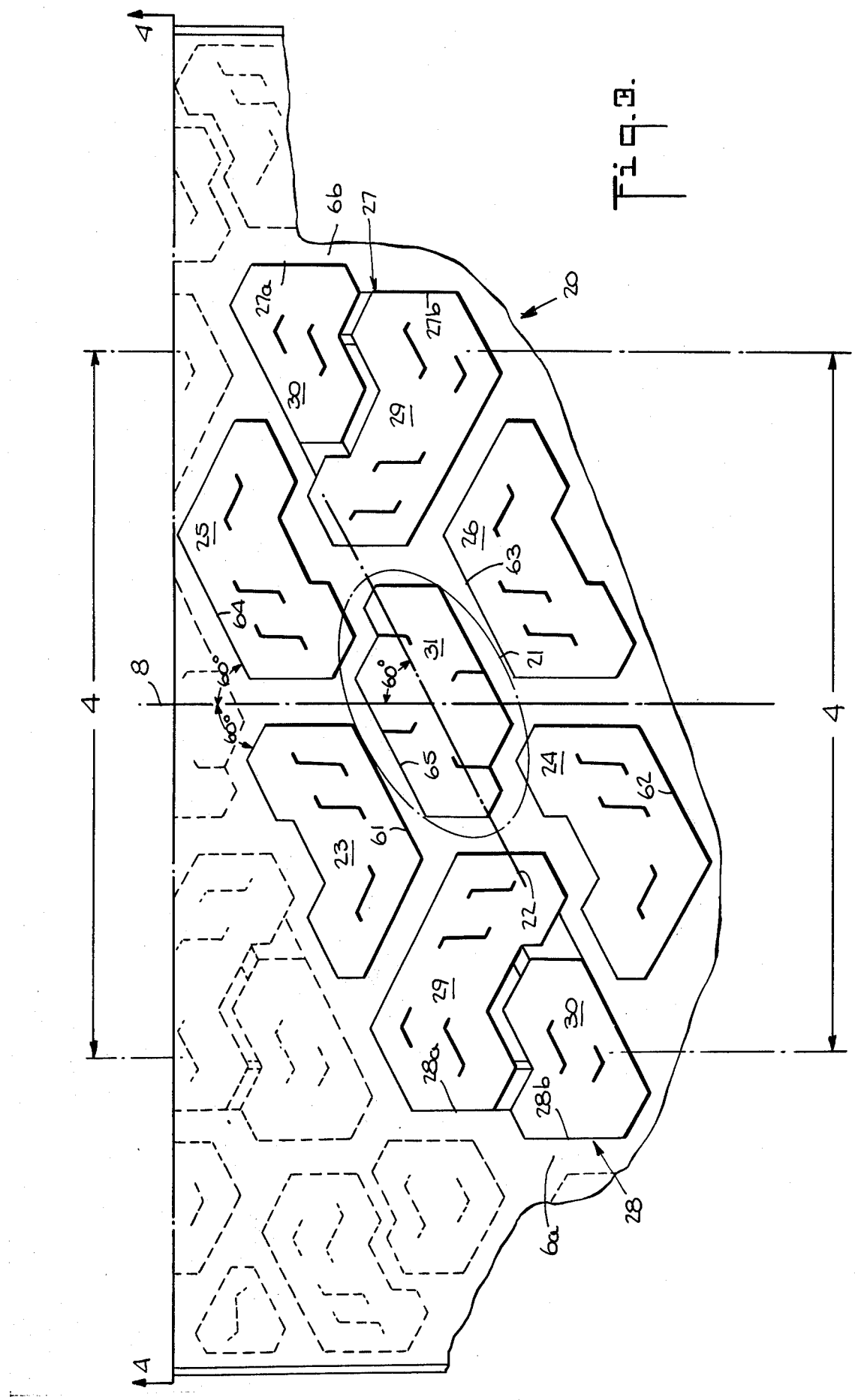

PNEUMATIC RADIAL TIRE TREAD PATTERN

This invention relates to pneumatic radial tires of the type in which the tread, the outer shoulders, and the radially outwardly positioned area of the sidewalls have a profile comprising lugs or blocks separated from one another by a system of interconnected channels or grooves. The tread lugs are arranged in rows in the circumferential direction and are differently oriented with respect to the circumferential direction from row to row.

As used herein, the term "cords" is intended to include threads, filaments, yarns, wires, cables, bands, braids, and the like.

Numerous pneumatic radial tires have rows of profiles lugs that run circumferentially and are separated by fine transverse grooves only. The rows of profiled lugs are separated from one another by circumferential relatively wide grooves as, for example, in the trade publication "Die Gummibereifung" July, 1968, page 29, representing a tire manufactured by Goodyear.

It is also known in the art that circumferential, rectilinear, zig-zag or other shaped wide grooves may be connected by grooves of substantial width perpendicular thereto and at a distance from one another in order to facilitate thereby the drainage of rain water out of the profile. See, for example, German Offenlegungsschrift No. 2,157,814.

There is also known in the art a tire of the type described above in which the entire profile is made up of rows arranged at a distance from one another in the direction of the tire axis. The rows are made up of circumferentially spaced apart profiled lugs of substantially identical contour and slope with respect to the equator of the tire. The slope of the longitudinal axes of the extended profile lugs with respect to the equator of the tire is 45°. The circumferentially oriented, relatively wide grooves between the rows of profiled lugs are substantially zig-zag shaped. The rows of profiled lugs arranged at the tread edges define with the rows of profiled lugs continuing in the outer sidewall area a shoulder groove running circumferentially in a zig-zag shape. This tire may be compared with the Rallye 240 type of rain train manufactured by Uniroyal.

This tire known in the art is suited in particular as a rain tire, that is, as a tire which, in view of its open and uniform profile provides increased security even on wet roads.

It is an object of the present invention to provide a new and improved pneumatic radial tire which is particularly reliable on wet roads.

It is another objective of the invention to provide a new and improved pneumatic radial tire in which the profiled tread lugs have substantially identical moments of inertia circumferentially and also have substantially identical moments of inertia in a lateral or transverse direction.

It is another object of the invention to provide a new and improved pneumatic radial tire in which the tread lugs have at all points of their contact area substantially identical surface pressures and high road holding ability on dry as well as on wet or snow covered roads and which are reliable in draining substantial volumes of water or waterlogged snow.

It is another object of the invention to provide a new and improved pneumatic radial tire having improved travel comfort achieved through a division of the shoulder of the tire tread.

In accordance with the invention, the profiled lugs are arranged at an angle of approximately 60° with respect to the circumferential direction of the tire and the predominant number of the edges of the majority of the profiled lugs also form an angle of about 60° with the circumferential direction of the tire. The profiled lugs are arranged in a ring-like fashion in a circumferentially repeating profile pattern with a group of lugs along an oval, the longitudinal axis of which forms an angle of about 60° with the circumferential direction. Further, the profiled lugs arranged at the extremity of the longitudinal axis of the ring form the shoulder and outer shoulder profile having a circumferentially widened lug area. This profile pattern preferably includes the profiled lugs forming the longitudinal side of the oval ring, and also at the same time being part of the circumferentially adjacent overlapping ring-shaped profile pattern and forming the longitudinal sides of the adjoining rings. With this arrangement there is achieved substantially uniform specific surface pressure of the traveling tire in which the positive to negative ratio, that is, the ratio of the lug area to the groove area, in the shoulder region of the tread is substantially greater than in the crown region adjacent the equator of the tire, the difference being preferably about 10%. As a result, there is achieved a shoulder profile that, notwithstanding use of a substantially identical profile lug type as in the crown region, appears to be more closed without impairing the uniformity of the profile pattern.

The plurality of the profiled lugs may be described as preferably having a contour in the shape of a small ship, with the longitudinal sides of the profiled lugs forming the ring pattern being oriented with their keel and deck edges substantially parallel to the longitudinal axis of the pertinent surrounding oval. With this design, there is achieved a profile having lugs of substantially identical moments of inertia in the circumferential direction and also having substantially identical moments of inertia of a different value in the lateral or transverse direction. Preferably in the center of each ring pattern there is arranged a lug extending across the equator of the tire in a sloping position with respect to the equator. There is achieved in this way a pattern of lugs that appear to be neither coarse, such as, for example, the lug pattern of a snow tire, nor to be composed of particularly fine element lugs, but rather, by providing a large contact area with the roads, there is provided a system of drainage grooves extending over the entire tread which is sufficiently open to provide reliable drainage.

The indicated directions of the edges of the profiled lugs and the various portions of the system of drainage grooves contribute substantially to reliable drainage and to a reinforcement of accelerating and braking as well as lateral control forces.

Preferably there is provided radially beneath the outer shoulder profile a circumferentially continuous decoupling groove consisting essentially of groove sections obtained parallel to the equator. The decoupling groove is situated radially beneath the tread, that is, beneath the outer shoulder profile and, therefore, can practically never close up, not even under load. On the other hand, however, the decoupling groove is capable of becoming restricted on the road as a result of which the contact area of the profile is enlarged into the outer shoulder areas. The decoupling groove adjoins directly a lug profile extending across the shoulder, which lug profile provides an additional reinforcement of the tread shoulder area. As a result of the decoupling grooves, that is, groove sections arranged preferably slightly laterally displaced with respect to one another, there is achieved a satisfactory elastic articulation effect without excessive softness at the transition point between the outer tread profile and the sidewall. The decoupling grooves provide in addition favorable drainage of the edge portions. They are capable of absorbing reliably and elastically all shocks which strike the belt-reinforced tread so that they guarantee a satisfactory balancing out between each sidewall and the tread. Even in the case of abrupt braking, each decoupling groove is usable to close. It becomes merely more restricted, thereby producing, as stated above, an enlargement of the contact area. Even forces absorbed by the sidewall and exerting an effect in the direction of the tread are absorbed by the decoupling grooves elastically in the manner of an articulation and are transmitted thereby eliminating the application against the tread of any forces likely to increase friction. As a result, the friction conditions at the tread become substantially more favorable. Also, the decouping groove situated beneath the outer shoulder profile permits an improved adaptation of the tread profile to the tire contact area so that notwithstanding the belt reinforcement, there is at all times complete contact with the road.

Pneumatic radial tires are known in the art in which the circumferentially oriented shoulder groove functionally lifts off the tread with respect to the sidewall in such a way that the shoulder groove forms an elastic articulation between these two tire components, see, for example, German Auslegeschrift No. 1,480,934 and German Offenlegungsschrift No. 1,605,609.

Applicant's German design registration No. 20MR3124, registered on Nov. 3, 1974, which is the subject to U.S. Pat. No. Des. 239,273, represents a tread lug pattern with respect to which the tire of the present invention has improved wear resistance, better drainage, better skid resistance, and greater comfort.

In accordance with the invention, a pneumatic radial tire comprises a carcass including at least one ply having cords disposed substantially radially of the tire and a reinforcing belt extending substantially circumferentially of the tire over the carcass. The tire also includes a tread portion, including shoulder portions, of elastomeric material over the carcass. The tire also includes outer shoulder and side portions of elastomeric material over the carcass. The tread and outer shoulder portions comprise similar circumferentially overlapping patterns, each pattern having lugs and grooves and having a first tread lug at the equator of the tire and having four similar tread lugs of different shape from the first lug. Each of the four similar lugs has its longest side substantially parallel to the longest side of the first lug. A first pair of the four similar lugs is adjacent a second lug at the equator in a second of the overlapping patterns and a second pair of the four similar lugs is adjacent a third lug at the equator in a third of the overlapping patterns.

For a better understanding of the present invention, together with other and further objects thereof, reference is made of the following description, taken in conjunction with the accompanying drawings, and its scope will be pointed out in the appended claims.

Referring now to the drawings:

FIG. 1 is a cross-sectional view, partly schematic, of a pneumatic radial tire constructed in accordance with the invention;

FIG. 3 is a fragmentary, developed plan view of the tread and sidewalls of the FIG. 1 tire representing a first tread and outer shoulder pattern of the tire; and FIG. 4 is a fragmentary, cross-sectional view of the tread and sidewalls of the tire, taken along line 4—4 of FIG. 3.

Figure 2:
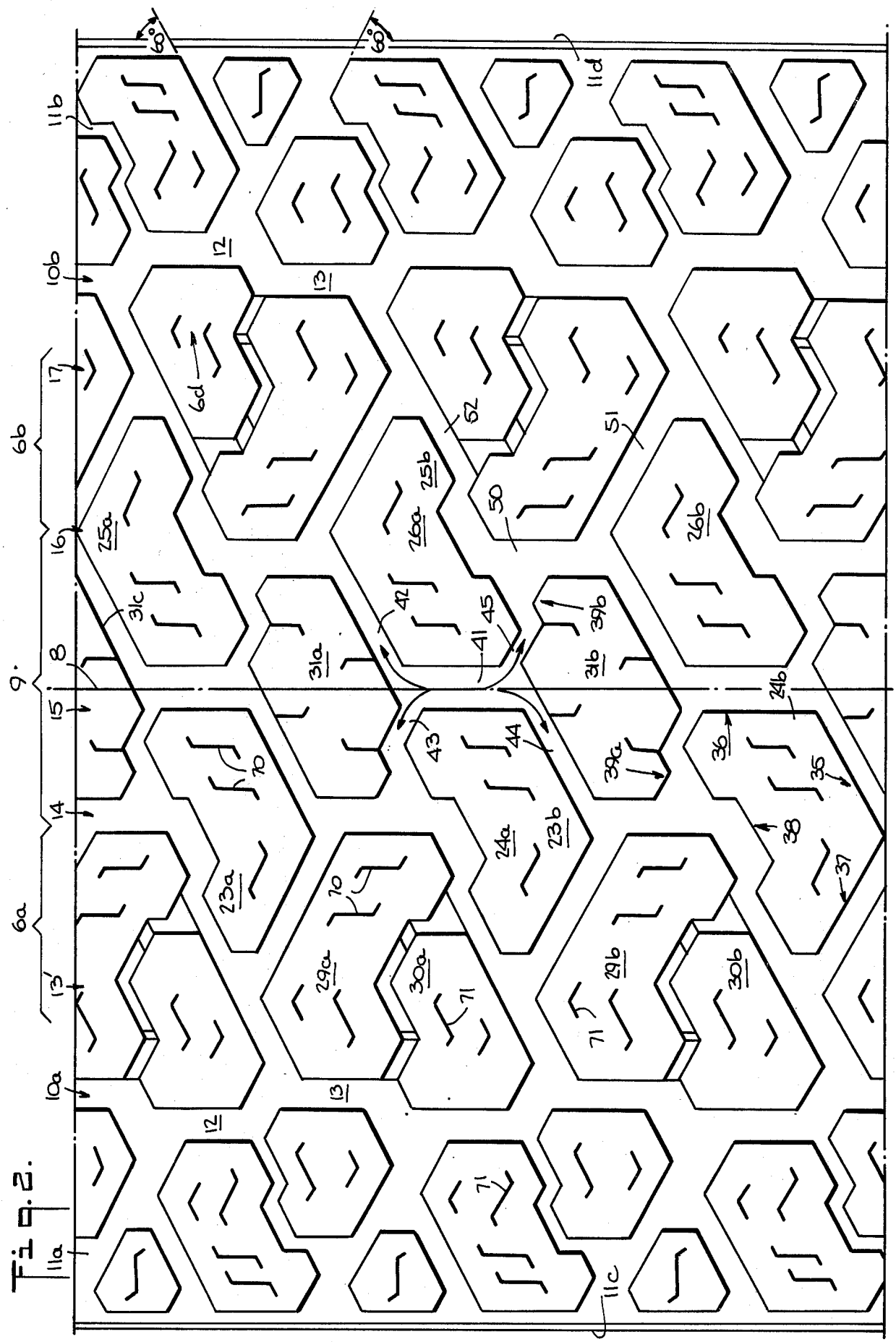
FIG. 2 is a fragmentary, developed plan view of the tread and sidewalls of the FIG. 1 tire.

Referring now more particularly to FIG. 1 of the drawings, the tire 1 there represented comprises a carcass with one or more plies 2 of a cord fabric preferably of a synthetic fabric or metal. The individual cords of the plies 2 extend substantially radially, that is, they form an angle of about 90° with the circumferential direction or the equator of the tire. The edges of the plies are placed in a well known manner around the bead wires 3. The tire had below the tread surface 4 a belt which comprises one or more reinforcement plies 5 of metallic cords which extend substantially circumferentially of the tire over the carcass plies 2. The cords of each reinforcement ply 5 preferably are parallel to each other and at a small angle of about 20° to 30° to the circumferential direction. If the belt consists of several reinforcement plies 5, as in the FIG. 1 embodiment, the cords extend preferably in the individual layers at opposite angles to the circumferential direction so that the cords of the several layers cross each other. The tire 1 also comprises tread portion 4, including shoulder portions 6a, 6b, of elastomeric material over the carcass plies 2. The tire also includes outer shoulder portions 6c, 6d and sidewall 7 portions of elastomeric material over the carcass plies 2.

Referring now also to FIGS. 2, 3 and 4, there is represented the entire profile of the tire extending across the tread 4, the shoulders 6a, 6b, the outer shoulders 6c, 6d and the upper portion of the sidewalls 7, with the equator of the tire represented by a reference line 8. The tread, whose width is referred to by the numeral 4 in FIG. 3 is defined by a crown profile region 9 (FIG. 2) in the region of the equator line 8 and two adjoining profile shoulder regions 6a, 6b. Laterally, the tread is bordered by outer shoulder regions 6c, 6d defined toward the sidewalls 7 by circumferentially oriented grooves 10a, 10b situated radially beneath the tread. Toward the outside, the grooves 10a, 10b are defined by decorative profile grooves 11a, 11b arranged in the upper portion of the sidewall and which pass over into smooth lower sidewalls having thereon circumferential ribs 11c, 11d of small width and thickness.

It can be seen that the two grooves 10a, 10b are composed of a plurality of relatively wide groove sections 12 and 13. The grooves 10a, 10b are adjacent each shoulder portion and are bounded by radially displaced adjacent shoulder lug portions and by radially displaced adjacent sidewall lugs. Each such groove 10a, 10b has relatively long sections 12, 13 extending circumferentially of the tire with adjacent sections being displaced transversely of the tire with respec to each other and communicating with each other. The transverse displacement of the adjacent sections 12, 13 of each such groove is relatively short with respect to the circumferentially extending lenght of each of the sections. The grooves 10a, 10b extend over the entire circumference and provide an elastically articulated balancing or neutralizing between the upper profile sidewall areas and the shoulder areas of the treads reinforced by the belt and adjoining on the other side. At the same time, the grooves are connected in an open flow path with the decorative profile and with the tread profile by groove sections oriented toward the equator, providing for reliable drainage of the shoulder areas of the tire.

Referring to FIGS. 2 and 3, the tread portion 4 and outer shoulder portions 6c, 6d comprise similar circumferentially overlapping patterns, for example, pattern 20 with each pattern having lugs and grooves and having a first tread lug 31 at the equator 8 of the tire and having four similar lugs 23, 24, 25, 26 of different shape from the first lug. Each of the four similar lugs 23, 24, 25, 26 has its longest side 61, 62, 63, 64, respectively, substantially parallel to the longest side 65 of the first lug. A first pair 23, 25 of the four similar lugs are adjacent a second lug at the equator in a second of the overlapping patterns and a second pair 24, 26 of the four similar lugs are adjacent a third lug at the equator in a third of the overlapping patterns. This relation may be seen more clearly with reference to FIG. 2 in which a greater number of lugs are represented. The first tread lug at the equator 8 may be considered as lug 31a. The four similar lugs of the first pattern may be considered as lugs 23a, 24a, 25a, 26a. A first pair 23a, 25a of the four similar lugs are adjacent a second lug 31c at the equator and a second pair 24a, 26a of the four similar lugs are adjacent a third lug 31b at the equator in a third of the overlapping patterns.

The entire tread and outer shoulder profile pattern illustrated in FIG. 1 comprises mainly profiled lugs of substantially identical contour and size which are arranged circumferentially in rows of profiled lugs of identical design and identical orientation. Thus, FIG. 2 shows within the profile section enclosed by the grooves 10a and 10b one initial row of profiled lugs 13' definining the shoulder area and the outer shoulder area of the tire, a second row 14 of profiled lugs arranged along one side of the equator 8 and a third row 15 of profiled lugs extending along the equator 8, a fourth row 16 of profiled lugs arranged along the other side of the equator 8 and corresponding to the row 14, and a last row 17 corresponding to the row 13' and comprising profiled lugs in the shoulder area and the outer shoulder area of the profile on that side of the tire.

Except for the equator lugs of the row 15, the majority of the profiled lugs has the contour of a small ship.

The tread and the outer shoulder profile of the tire has a circumferentially regularly repeating profile pattern 20 consisting of a plurality of profiled blocks 23–28 arranged in ring-like fashion around an oval suggested in FIG. 3 by a broken line 21. The longitudinal axis 22 of the oval ring pattern is sloped with respect to the equator 8 at an angle of approximately 60°. All profiled lugs belonging to the ring 20 are essentially of the small ship-like contour already mentioned above with the two profiled lugs 27 and 28 situated at the extremities of the longitudinal axis 22 of the ring consisting of a ship-like profiled block 29 supplemented by one-half of a ship-like profiled lug 30 that is fitted into the profiled lug 29. The two elements 29, 30 of the profiled lugs situated at the extremities may be separated from one another by grooves of complete or limited depth, as one can readily note from FIG. 3. The profiled lugs at the end of the ring 20 are given in this way essentially the contour of an isosceles triangle whose tip is oriented toward the center of the ring and one side of which is oriented outside for the purpose of defining the adjacent groove 10a or 10b. The outwardly oriented portion of the triangle is constituted by two stepped sections 27a, 27b, and 28a, 28b, respectively, defining thereby the course and the border of the grooves 10b and 10a, respectively.

The longitudinal sides of the ring arrangement 20 are respectively constituted by two ship-like profiled blocks 23, 25 and 24, 26 which are arranged at identical spacings from the equator 8, are turned with respect to one another in the tread plane by 180°, and are oriented with the majority of their bordering edges at an angle of approximately 60 degrees with respect to the equator 8. The majority of the edges of the lugs 29 and 30 are at an angle of approximately 60° with respect to the equator 8 and the majority of the edges of all the tread and outer shoulder lugs of the pattern 20 are at an angle of approximately 60° with respect to the equator 8. The angle of 60° for the edges with respect to the equator 8 may be measured as either of the angles indicated as being 60° with respect to the equator 8 in FIG. 3. As can be seen from FIG. 2, the two ship-like profiled lugs defining each longitudinal side of the ring-like arrangement 20 belong in this case simultaneously also to the adjoining ring pattern by forming the longitudinal side thereof. In FIG. 2 there are suggested two ring patterns by using the references applied to the profiled lugs according to FIG. 3 and designated for the purpose of distinction from one another by the letters a and b with the two ship-like profiled blocks assigned to the rings containing in each case two different reference numbers in order to suggest that these elements belong at the same time to two ring patterns.

Referring to FIG. 3, in the center of each ring pattern there is arranged an equator lug 31 oriented with its longitudinal direction and its longitudinal edges likewise at an angle of approximately 60° with respect to the equator 8.

It can be seen that as a result of the complementary shapes of the profiled lugs 27–30 situated at the extremities of the longitudinal axis 22, the positive-to-negative ratio of the surface area of the lugs to grooves is in that region substantially greater, preferably by 10%, than in the crown region 9. This reinforced profile constitutes in this case the shoulder regions 6a, 6b of the tread as well as the outer shoulder regions 6c, 6d.

The defining edges forming the keel 35 and the deck 38 as well as the stern 37 of each ship-like profiled lug (see the lug 24b in FIG. 2) are aligned at an angle of approximately 60° with respect to the equator 8. In this case the two profiled lugs, for example, the two profiled lugs 23 and 25, constituting one longitudinal side of the ring pattern, define a wide groove 41 running along the equator 8 at the downstream and upstream extremities of which there is arranged in each case at a 60° angle to the equator 8, lug 31a and lug 31b, respectively, of two sequential ring patterns.

The groove section 41 along the equator 8 is interconnected at its extremities via smaller channels 42, 43, 44, 45 running in a star-shaped pattern toward the outside and at a slope to the equator 8 with enlarged groove sections 50 situated at a distance from the equator 8, which consist of wide groove sections running substantially parallel to the equator 8 and an enlargement defined in each case between the deck edge of a ship-like profiled lug and a nose 39a or 39b of the block 31b at the equator 8. These enlarged groove systems 50 are, in turn, openly connected with the grooves 10a, 10b via respectively two divergent more narrow channels 51, 52 sloped at an angle of 60° with respect to the equator 8. As a result, it is possible to achieve even in the case of large quantities of rain or large amounts of waterlogged snow a very high absorption capacity of the groove system and a reliable discharge and drainage effect of this system.

The ring pattern 20 described above produces a tread profile whose specific surface pressure is substantially identical at all points of the contact area. Moreover, in the case of this design of the profiled lugs, the lugs have substantially identical moments of inertia in the circumferential direction and also have substantially identical moments of inertia of a different value in the lateral direction perpendicular thereto. The profile exhibits a high road-holding capacity in the case of a dry as well as a wet or snow-covered road by taking up and discharging even substantial quantities of available water. Notwithstanding the increased stiffening and the increase of the previously mentioned positive-to-negative ratio in the shoulder region of the profile, the design and position of the grooves 10a, 10b make it possible to achieve increased travel comfort.

The drainage of the crown region of the profile as well as the absorption of water in this area are particularly high in view of the fact that each lug 31 at the equator is surrounded by four circumferentially oriented wide groove sections 41 and 50, respectively.

Each ship-like profiled block is preferably designed with ten limiting edges. The trough in the area of the deck edge 38 contributes substantially, in cooperation with the nose-shaped projections 39a, 39b of each lug 31 at the equator to the high absorption and drainage capacity of the enlarged groove sections 50. Throughout the drainage-groove system, the groove sections 50 provide the largest unobstructed groove volume. The oblique grooves leading toward each groove section 50 provide for a controlled discharge of the fluid by means of throttling.

The profiled lugs are preferably provided with fine slits as illustrated in FIGS. 2-4. The arrangement is preferably such that in the crown region of fine slits 70 (FIG. 2) are arranged preferably parallel to the equator 8 and that, in the shoulder and outer shoulder regions, the fine slits 71 are oriented preferably cross-wise or obliquely to the equator 8. This that in the crown region the fine slits are oriented in the direction of the main forces and, in the marginal regions, in the direction of the lateral forces. As a result of these fine slits, there is promoted complete contact of each profiled lug with the road. These fine slits likewise assist the traction effect of the profile in the case of wintery road conditions.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pneumatic radial tire having an equator comprising:
   a carcass including at least one ply having cords disposed substantially radially of the tire;
   a reinforcing belt extending substantially circumferentially of the tire over said carcass;
   a tread portion, including shoulder portions, of elastomeric material over said carcass;
   and outer shoulder and sidewall portions of elastomeric material over said carcass, said tread and outer shoulder portions comprising similar circumferentially overlapping patterns, each pattern having lugs and grooves and having a first tread lug at the equator of the tire and having four similar tread lugs of different shape from said first lug, first tread lug has a shape of a polygon having opposite sides parallel and substantially equal in length, wherein said different shape of said four similar tread lugs is a polygon having sides unequal in length, each of said four similar lugs having its longest side substantially parallel to the longest side of said first lug, wherein said four similar tread lugs surround said first tread lug, a first pair of said four similar lugs being adjacent a second lug at the equator in a second of said overlapping patterns and each of said first pair of said four similar lugs having its longest side substantially parallel to the longest side of said second lug, said first pair of said four similar tread lugs separating said first tread lug and said second tread lug along the equator, wherein said second tread lug is of substantially the same shape as said first lug, and a second pair of said four similar lugs being adjacent a third lug at the equator in a third of said overlapping patterns and each of said second pair of said four similar lugs having its longest side substantially parallel to the longest side of said third lug, wherein said first and second pairs of said four similar tread lugs surround said second tread lug, said second pair of said four similar tread lugs separating said second tread lug and said third tread lug along the equator, wherein said third tread lug is of substantially the same shape as said first lug.

2. A tire in accordance with claim 1 in which the majority of the sides of said lugs are disposed at an angle of approximately 60° with respect to the equator of the tire.

3. A tire in accordance with claim 1 which has lug portions and transverse grooves in said shoulder portions and lug portions and grooves in the tread portion adjacent said equator of the tire with the ratio of the lug area to the groove area in said shoulder portions being substantially greater than the ratio of the lug area of the groove area in said tread portion adjacent said equator of the tire.

4. A tire in accordance with claim 1 having lug portions in said outer shoulder portions and in said sidewall portions and having a groove adjacent each outer shoulder portion and bounded by radially displaced adjacent outer shoulder lug portions and by radially displaced adjacent sidewall lugs, each said groove adjacent each outer shoulder portion having relatively long sections extending circumferentially of the tire with adjacent sections being displaced transversely of the tire with respect to each other and communicating with each other, the transverse displacement of said adjacent sections of each said groove adjacent each outer shoulder portion being relatively short with respect to the circumferentially extending length of each of said sections.

* * * * *

UNITED STATES PATENT OFFICE
CERTIFICATE OF CORRECTION

Patent No. 4,055,209            Dated October 25, 1977

Inventor(s) Gerhard Franz-Josef Senger

It is certified that error appears in the above-identified patent and that said Letters Patent are hereby corrected as shown below:

The term of this patent subsequent to

February 22, 1991, has been disclaimed.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,055,209
DATED : October 25, 1977
INVENTOR(S) : Gerhard Franz-Josef Senger It is certified that error appears in the above-identified patent and that said Letters Patent are hereby corrected as shown below:

Column 8, line 9 after "lug," insert --wherein said--

Column 8, line 46 read "of" (second occurrence) as --to--

Signed and Sealed this

Twenty-ninth Day of January 1980

[SEAL]

Attest:

SIDNEY A. DIAMOND

Attesting Officer     Commissioner of Patents and Trademarks